(No Model.)
O. B. PECK.
PROCESS OF SEPARATING METALS, MATTE, OR METALLIC COMPOUNDS FROM MOLTEN SLAGS.
No. 392,455. Patented Nov. 6, 1888.
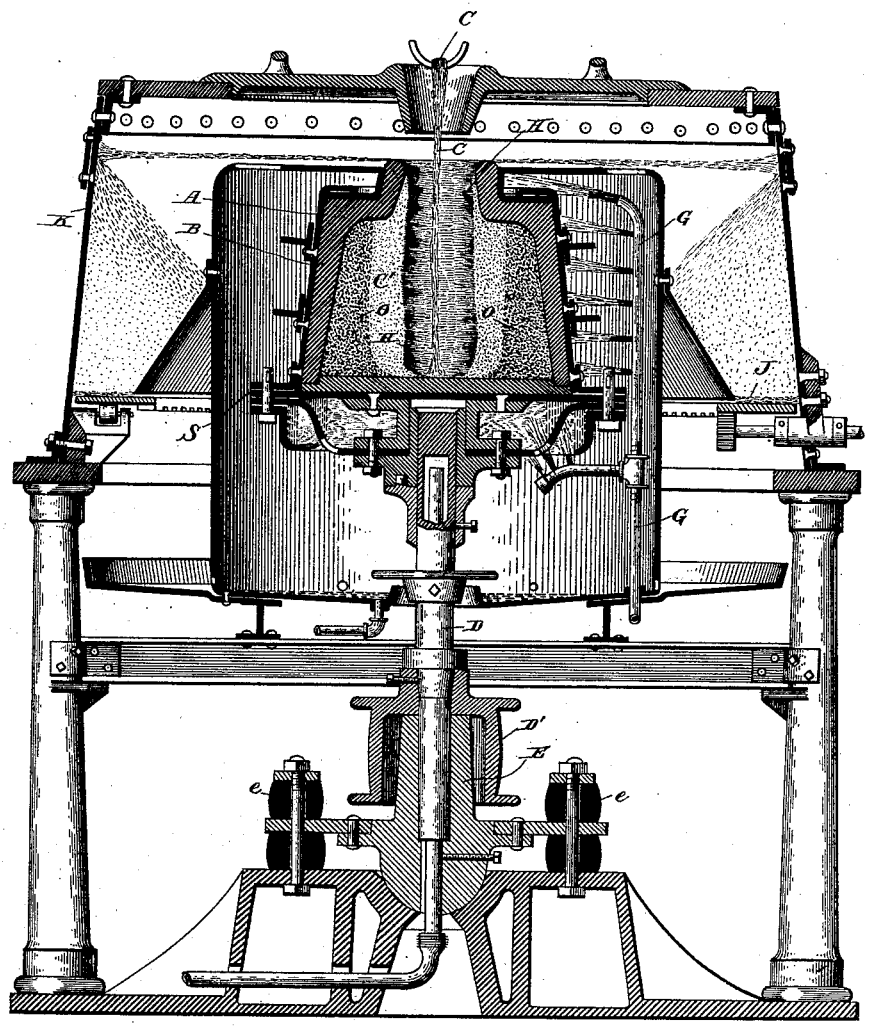
WITNESSES.
Edwin L. Yewell,
John Enders, Jr.
INVENTOR,
Orrin B. Peck.

UNITED STATES PATENT OFFICE.

ORRIN B. PECK, OF CHICAGO, ILLINOIS.

PROCESS OF SEPARATING METALS, MATTE, OR METALLIC COMPOUNDS FROM MOLTEN SLAGS.

SPECIFICATION forming part of Letters Patent No. 392,455, dated November 6, 1888.

Application filed September 21, 1888. Serial No. 286,018. (No specimens.)

*To all whom it may concern:*

Be it known that I, ORRIN B. PECK, a citizen of the United States, residing at Chicago, in the county of Cook and State of Illinois, have invented certain new and useful Improvements in the Process of Separating Metals, Matte, or Metallic Compounds from Molten Slags; and I do hereby declare the following to be a full, clear, and exact description of the invention, such as will enable others skilled in the art to which it appertains to make and use the same.

The object of my invention is to separate metal and matte or metallic compounds from molten slag; and my invention consists in the process hereinafter described and claimed.

The accompanying sheet of drawings, which forms part of this application, represents an apparatus partly in vertical section, which apparatus may be used in carrying out the process herein described and claimed.

To properly understand the principles upon which the chemical process herein described is founded, it will be desirable to first consider the materials treated and then the chemical results attained. By "slag" I mean the product or products of furnaces employed in smelting ores, and by the term "slag" I intend covering any substance of similar characteristics produced artificially or found in nature, and by metallic compounds I mean any compound or salt of metal which may be carried in slag and matte, or like furnace products which may be separated or treated by my process. The compounds or salts carried in slags or mattes may be partially fused, or partially-reduced particles of ores or metals, or both combined; and it is a well-known fact that considerable quantities of fine particles of molten metal are carried off in slag, causing a material loss of precious or valuable metals by present smelting operations, which particles, compounds, and salts can be saved by my process.

As the principle or force employed in my operation is founded upon the law of gravitation, it is obvious that it is necessary to have the slag or like materials fluid while being subjected to the operation herein described.

Metals and matte or metallic compounds are now separated from molten slags simply by allowing the heavier particles to settle and collect at the bottom of the slag-pot or like device; but the difficulties experienced by this method are, that much of the valuable material which should be separated from the lean slag has a specific gravity very nearly the same as the bulk of the slag in which it is contained, and for this reason such material is not readily separated from the slag by the ordinary operation of settling in slag-pots or like devices. To avoid the loss of these valuable portions it is necessary to use costly fluxes in the smelter, and to reduce the slag to a very thin fluid state and retain it in such a condition for some length of time while the separation is taking place, all of which requires the exercise of much care, and, although very expensive, is quite inefficient.

In the event of difficultly fusible, stiff, or thick slags the losses of the fine particles of metal above described are very large, because of the resistance to their settling afforded by the thick or insufficiently-fused or fluid slags, and it is a well-known fact that by the present methods of separating these metallic products from molten slag by gravitation there is always a great loss of the particles of valuable metals and matte. It is evident, therefore, from the above that according to the state of division or the specific gravity of the particles of metal or other products to be separated the fluidity of the slag and other conditions that the ordinary gravitation treatment is tedious, at the same time the results being notably insufficient and unsatisfactory. By the process herein described the finely-divided and other particles of metal are instantly and completely separated from the slag or the slag from the metals by centrifugal force.

In carrying out my process the fluid and mixed products or slag direct from the smelting-furnace, or remelted slag carrying valuable or precious metals, is subjected to centrifugal action in a suitable machine, which operation I find by actual demonstration almost instantly separates and retains the metallic or valuable parts to be saved and throws off the lean slag. This operation is accomplished so rapidly and effectively that the lean slag is thrown off in the molten condition and does not have time to cool perceptibly. In cases wherein molten slag is thick or semi-fluid, so as not to be capable of treatment by the old method of gravitation, the centrifugal force is so great as to overcome the resistance it may offer to the separation of particles of greater specific gravity and to separate them very rapidly.

In making an apparatus for carrying out my process I provide a revoluble tub or vessel, A, adapted to receive molten slag, preferably mounted upon the upper end of and carried by a vertical spindle, D, which is provided with a belt-wheel, D', by which it is revolved, carrying with it the revoluble tub or vessel A. The spindle D is journaled in and supported by a suitable box, E, which is preferably secured to a suitable frame-work by the cushions e, so as to be vertically flexible.

The tub or vessel A is made of sufficient strength to withstand the great centrifugal force while in use, and preferably is arranged to stand vertically with an opening in its top somewhat smaller than the diameter of the body of the vessel, so as to leave an annular overhanging ring or portion, as is shown in the drawing. I also prefer to provide this vessel with a suitable lining, B, of cast-iron, and make the lining and the outer shell separable in two or more parts by any well-known means, which, in the case illustrated, is flanged and provided with cotter-bolts at the point S. The object of making the vessel separable is to facilitate the removal of the valuable or hardened material collected within. I further preferably provide a curb, K, to catch the lean slag as it is discharged from the vessel A, and a revolving table, J, to carry it away. I also prefer to provide a water or steam pipe, G, to keep the exterior of the vessel A cool, and such other parts as may be necessary to the convenient operation of the machine, all of which may be varied to suit the operator or conditions of operating.

In carrying on my process I take molten slag or other products from a smelting-furnace which contains the parts to be separated, and after first causing the vessel A to revolve very rapidly by means of a belt from any suitable source of motive power I pour the molten slag C into the vessel through the hole in the top, and as the slag falls on the bottom of the vessel it will be thrown instantly to the sides of the vessel by centrifugal force, the heavier particles being carried to the outside. As the slag continues to flow in, it will be collected on the sides of the vessel and assume a vertical position, forming a vertical annular wall, H, as shown in the drawing, until the vessel has become filled to the inner edge of the annular overhanging ring or portion. Then as the slag continues to flow into the vessel, striking the bottom and being thrown to the sides, it will be arrested by the interior of the annular vertical column or wall of slag and be driven upward and discharged at the top of the vessel, as shown, all by centrifugal force.

When the operation commences, as above described, and the molten slag is first introduced into the revolving vessel, the particles of metal and matte or metallic compounds having the greatest specific gravity or density will be driven to the outside of the revolving mass, as shown and indicated by O, leaving the lean slag and lighter portions C' on the inside. When the vessel has become sufficiently filled to discharge the lean slag, the heavier particles of the newly or continuously introduced slag will be separated and thrown outward while the slag is passing from the bottom of the vessel up the vertical wall, (indicated by H.) The metal or portions thus thrown back, being the heavier, pass into and through the wall and slag (indicated by H and C') and displace an equivalent bulk of the lighter slag, (indicated by C',) forcing it upward to be discharged at the top, while the heavier metallic or other parts displacing it are retained. This operation may continue until the parts to be saved (indicated by O) have filled the vessel so full that they are liable to be discharged or until they have approached the line H, when they must be emptied or removed, and the operation may be repeated, although, if desired, in the employment or operation of my process the vessel while revolving may only be filled with a sufficient amount of molten slag to approach the line indicated by H and not discharge any of its contents, and may be revolved until the molten material within has become cooled and hardened, when it may be removed and assorted to suit the operator, the separation of the particles of metal from slag being as described in the first-named operation.

As an example of the great power exerted by centrifugal action as applied to the separation of metals, matte, or metallic compounds from slags, I find as a rough estimate from experiments made by me with a vessel twenty inches in diameter, containing about five hundred pounds of molten slag and revolving eleven hundred times per minute, that a centrifugal force of about one hundred tons is exerted upon the particles of the fluid mass, and as a well-known law of mechanics this force will be increased directly in proportion to the square of the velocity of the centrifugal machine.

The particular machine or apparatus for putting my process into execution which I have used is herein described and illustrated, as it appears to be useful for a proper understanding of the process; but I do not herein make any claim for the same, as I have covered this apparatus in an application, Serial No. 285,158, filed September 11, 1888; but it is obvious that any kind of a centrifugal machine may be employed that is of sufficient strength to withstand the strain of the rapid rotation and that is adapted to hold the molten material.

What I claim as new, and desire to secure by Letters Patent, is—

1. The process of separating metals, matte, or metallic compounds from molten slag or like molten materials, which consists in subjecting the same to centrifugal action, substantially as described.

2. The process of separating metals, matte, or metallic compounds from molten slag or like molten materials, which consists in subjecting the same to centrifugal action and discharging the lean slag, substantially as described.

In testimony whereof I hereunto affix my signature in presence of two witnesses.

ORRIN B. PECK.

Witnesses:
GEO. M. FINCKEL,
J. M. CURTIS.